(12) United States Patent
Koshiba et al.

(10) Patent No.: US 10,000,205 B2
(45) Date of Patent: Jun. 19, 2018

(54) FAIL-SAFE CONTROL APPARATUS FOR HYBRID VEHICLES

(71) Applicant: Nissan Motor Co., Ltd., Yokohama-shi, Kanagawa (JP)

(72) Inventors: Kenji Koshiba, Kanagawa (JP); Takeo Aizawa, Kanagawa (JP); Hideki Kawashima, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days. days.

(21) Appl. No.: 15/556,332

(22) PCT Filed: Mar. 20, 2015

(86) PCT No.: PCT/JP2015/058401
§ 371 (c)(1),
(2) Date: Sep. 7, 2017

(87) PCT Pub. No.: WO2016/151657
PCT Pub. Date: Sep. 29, 2016

(65) Prior Publication Data
US 2018/0093660 A1 Apr. 5, 2018

(51) Int. Cl.
*B60W 20/40* (2016.01)
*B60K 6/48* (2007.10)
*B60K 6/543* (2007.10)
*B60L 11/18* (2006.01)
*B60W 10/06* (2006.01)
(Continued)

(52) U.S. Cl.
CPC ............ *B60W 20/40* (2013.01); *B60K 6/48* (2013.01); *B60K 6/543* (2013.01); *B60L 11/1861* (2013.01); *B60W 10/06* (2013.01); *B60W 30/192* (2013.01); *B60L 2210/40* (2013.01);
(Continued)

(58) Field of Classification Search
CPC .... B60W 20/40; B60W 30/192; B60W 10/06; B60K 6/48; B60K 6/543; B60L 11/1861; F02N 11/0851
See application file for complete search history.

(56) References Cited

U.S. PATENT DOCUMENTS 7,030,596 B1 * 4/2006 Salerno ................. H02M 3/158
323/282
8,788,132 B2 7/2014 Aizawa et al.
(Continued)

FOREIGN PATENT DOCUMENTS

JP 11-280886 A 10/1999
JP 2012-86738 A 5/2012
(Continued)

*Primary Examiner* — Mussa A Shaawat
(74) *Attorney, Agent, or Firm* — Global IP Counselors, LLP

(57) ABSTRACT

A fail-safe control device is provided for hybrid vehicles which allows a travel distance of a vehicle to be extended in an event of an ON-failure of a second clutch. An integrated controller switches between an HEV mode and an EV mode by controlling a first clutch between an engine and a motor, and a second clutch between the motor and a continuously variable transmission. The integrated controller prohibits the transition from the HEV mode to the EV mode when a clutch failure determination unit detects an ON-failure of the second clutch while the vehicle is traveling in the HEV mode.

6 Claims, 9 Drawing Sheets

(51) Int. Cl.
   *B60W 30/192* (2012.01)
   *F02N 11/08* (2006.01)
(52) U.S. Cl.
   CPC ..... *B60L 2240/421* (2013.01); *F02N 11/0851* (2013.01)

(56) References Cited

U.S. PATENT DOCUMENTS

| | | | |
|---|---|---|---|
| 8,903,585 | B2 | 12/2014 | Tanishima et al. |
| 9,580,068 | B2 | 2/2017 | Mohri |
| 2006/0180362 | A1* | 8/2006 | Yamaguchi ............ B60K 6/445 180/65.235 |
| 2014/0038773 | A1* | 2/2014 | Heap ...................... B60K 6/387 477/5 |
| 2014/0046522 | A1* | 2/2014 | Heap ...................... B60W 10/08 701/22 |
| 2014/0309823 | A1* | 10/2014 | Heap ...................... B60W 10/06 701/22 |
| 2015/0175168 | A1* | 6/2015 | Hoye ...................... B60W 40/09 434/64 |
| 2016/0176395 | A1* | 6/2016 | Hata ...................... B60W 20/40 701/22 |

FOREIGN PATENT DOCUMENTS

| | | |
|---|---|---|
| WO | 2012/056862 A1 | 5/2012 |
| WO | 2012/057131 A1 | 5/2012 |
| WO | 2013/077161 A1 | 5/2013 |

\* cited by examiner

| | CL STATE AT TIME OF FAILURE | | VEHICLE STATE AT TIME OF FAILURE | FAIL-SAFE PROCESS |
| --- | --- | --- | --- | --- |
| SHIFT POSITION | CL1 | CL2 | | |
| (a) D/R | | ON-FAILURE | HEV LU | HEV FIX |
| (b) D/R | | ON-FAILURE | EV LU<br>HEV LU ⇒ EV LU<br>(TRANSITIONING) | EV FIX |
| (c) D/R | | ON-FAILURE | OTHER THAN ABOVE (CL2 SLIP)<br>(INCLUDING DURING TRANSITION<br>ENGINE STARTING) | STOP DRIVE FORCE, STOP VEHICLE,<br>THEN READYOFF |
| (d) N | AS COMMANDED | RELEASED<br>*ON-FAILURE<br>BUT RELEASED<br>BY M/V | ALL | STOP DRIVE FORCE, STOP VEHICLE, THEN<br>READYOFF |
| (e) P | | | STOPPED<br>(P RANGE) | PERMIT ACTIVATION |
| (f) D/R | ON-FAILURE | | ALL | STOP DRIVING FORCE, STOP VEHICLE,<br>THEN READYOFF |
| (g) N | ON-FAILURE | RELEASED<br>*ON-FAILURE<br>BUT RELEASED<br>BY M/V | ALL | STOP DRIVE FORCE, STOP VEHICLE<br>READYOFF |
| (h) P | | | STOPPED<br>(P RANGE) | PERMIT ACTIVATION |

FIG. 7

FAIL-SAFE CONTROL APPARATUS FOR HYBRID VEHICLES

CROSS-REFERENCE TO RELATED APPLICATIONS

This application is a U.S. National stage application of International Application No. PCT/JP2015/058401, filed Mar. 20, 2015.

BACKGROUND

Field of the Invention

The present invention relates to a fail-safe control device for hybrid vehicles.

Background Information

Conventionally, in a vehicle having an engine as a drive source, a friction element is provided on a drive axis, and the operating pressure that is supplied to this friction element is controlled in order to switch between engagement and disengagement of the friction element. A desired engagement state corresponding to the driving state is thereby realized in the friction element. In addition, some vehicles provided with a friction element as described above are provided with a means to detect a faulty state of the friction element, and this detection means determines ON-failures, in which the connection of the friction element cannot be released, and OFF-failures, in which engagement cannot be made (for example refer to Japanese Laid-Open Patent Application No. Hei 11 (1999)-280886—Patent Document 1).

SUMMARY

Conventionally, a hybrid vehicle is known in which a first clutch is provided between an engine and a motor, and in which a second clutch is provided between the motor and a transmission. In this hybrid vehicle, when switching from an EV mode in which traveling is carried out by the driving force of the motor, to an HEV mode in which traveling is carried out by the driving force of the engine and the motor, the first clutch is connected while slipping the second clutch, and the engine is cranked to transition to the HEV mode. Consequently, when switching from the EV mode to the HEV; mode becomes difficult during traveling in the HEV mode, it is necessary to continue in the HEV mode as much as possible without switching from the EV mode to the HEV mode. However, since a conventional hybrid vehicle is not configured to continue traveling in the HEV mode in such cases, the vehicle switches to the EV mode even if the second clutch has failed. That is, since a conventional hybrid vehicle shifts to the EV mode even if the second clutch has failed, it becomes difficult afterwards to shift back to the HEV mode, so that traveling is limited to the EV mode. Therefore, since the cruisable distance of a hybrid vehicle that is limited to the EV mode is determined according to the remaining battery capacity, a problem occurs in that the cruisable distance becomes shorter compared with traveling in the HEV mode.

In view of the problem described above, an object of the present invention is to provide a fail-safe control device for hybrid vehicles that is capable of extending the travel distance of a vehicle in the event of an ON-failure of the second clutch.

In order to realize the object described above, the present invention relates to a fail-safe control device for hybrid vehicles, comprising a power source consisting of an engine and a motor, and a transmission provided between the motor and drive wheels. A first clutch that connects and disconnects the engine and the motor is provided between this transmission and engine, and a second clutch that connects and disconnects the motor and the transmission is provided between the motor and the transmission. In addition, this fail-safe control device comprises a clutch failure determination means that detects an ON-failure in which the connection of the second clutch cannot be released, and a controller that switches between an HEV mode that uses an engine and a motor as drive sources, and an EV mode that uses only the motor as a drive source. In the present invention, the controller prohibits a transition from the HEV mode to the EV mode when detecting an ON-failure of the second clutch during traveling in the HEV mode.

In the fail-safe control device for hybrid vehicles of the present invention, in the event of an ON-failure of the second clutch during traveling in the HEV mode, the controller prohibits a transition to the EV mode. Therefore, in the present invention, it becomes possible to extend the travel distance by the amount with which the engine can be driven using fuel, compared to the case in which a transition to the EV traveling mode is allowed in the event of an ON-failure of the second clutch.

BRIEF DESCRIPTION OF THE DRAWINGS

Referring now to the drawings, a fail-safe control device for hybrid vehicles is illustrated.

FIG. 7 is a control list listing the modes of the fail-safe control in the fail-safe control device for hybrid vehicles according to the first embodiment.

DETAILED DESCRIPTION OF THE EMBODIMENTS

Figure 1:
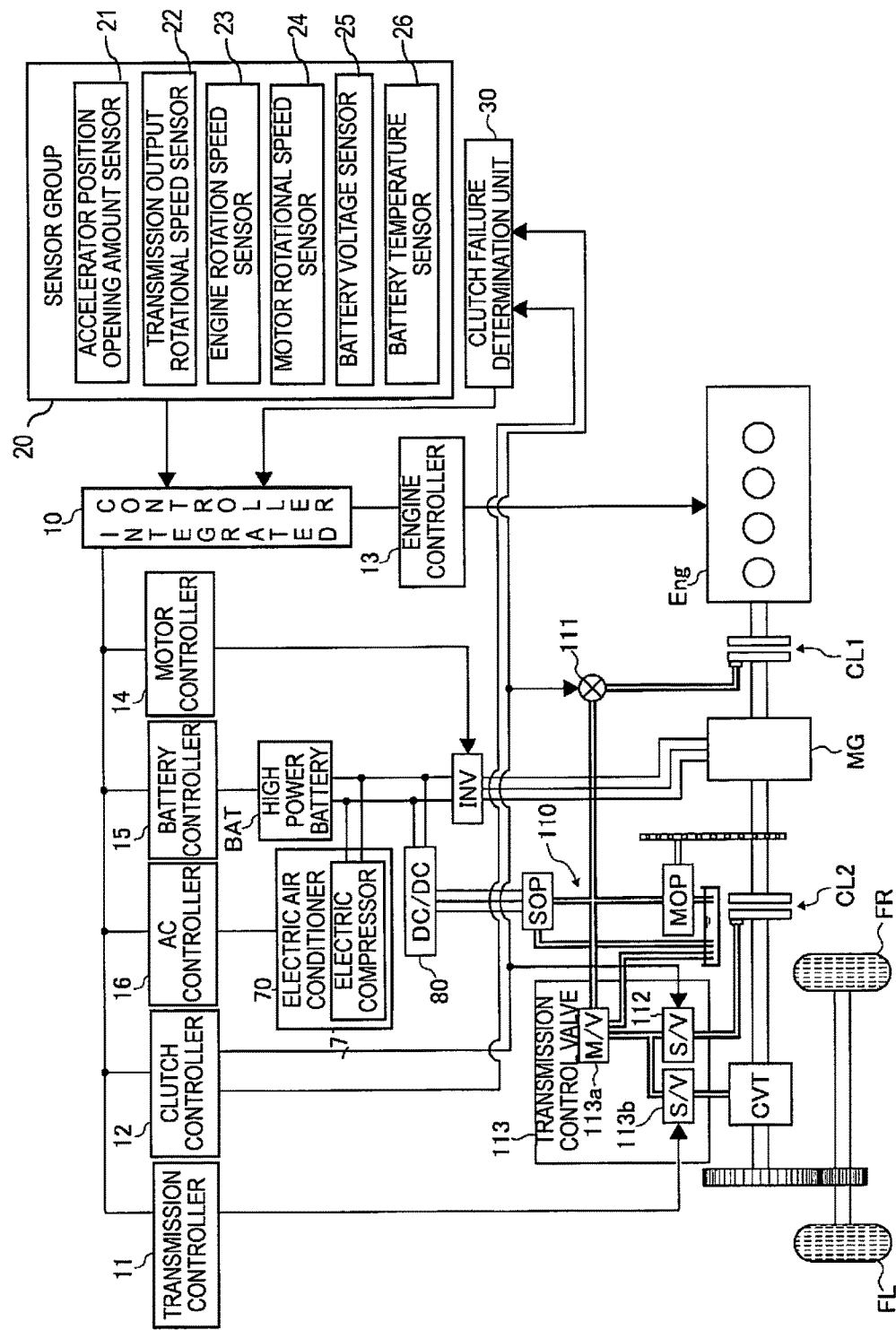
FIG. 1 is an overall system view schematically illustrating an overall configuration of a hybrid vehicle provided with the fail-safe control device according to the first embodiment.

A preferred embodiment for realizing the fail-safe control device for hybrid vehicles of the present invention is described below based on the embodiments illustrated in the drawings.

First Embodiment

First, the configuration of the fail-safe control device for hybrid vehicles of the first embodiment will be described. The fail-safe control device for hybrid vehicles according to the first embodiment is applied to an FF hybrid vehicle (hereinafter simply referred to as hybrid vehicle) having left and right front wheels as the drive wheels, and equipped with a belt-type continuously variable transmission as the transmission. The "overall system configuration of a hybrid vehicle," the "control system of the hybrid vehicle," (control by the integrated controller), (clutch failure determination unit), and (fail-safe control) will be separately described below, regarding the configuration of the fail-safe control device for hybrid vehicles according to the first embodiment.

Overall System Configuration of a Hybrid Vehicle

FIG. 1 is an overall system view of the hybrid vehicle to which is applied an electrical leakage detection device of the first embodiment. The overall system configuration of the hybrid vehicle will be described below, based on FIG. 1.

A drive system of a hybrid vehicle is provided with an engine Eng, a first clutch CL1, a motor-generator MG (hereinafter referred to as motor MG), a second clutch CL2, and a continuously variable transmission CVT.

That is, the drive system of the hybrid vehicle is configured so that it is possible for the outputs of the engine Eng and the motor MG as drive sources to be shifted to a predetermined transmission ratio by the continuously variable transmission CVT and transmitted to the left and right front wheels FL and FR as the drive wheels.

Additionally, in this drive system of the hybrid vehicle, a first clutch CL1 that is able to connect and disconnect the drive transmission is provided between the engine Eng and the motor MG, and a second clutch CL2 that is able to connect and disconnect the drive transmission is provided between the motor MG and the continuously variable transmission CVT. It is thereby possible to form an HEV traveling mode in which both clutches CL1 and CL2 are engaged, and traveling is carried out by the drive force of the engine Eng and the motor MG. In addition, it is possible to form an EV mode in which the first clutch CL1 is released and the second clutch CL2 is engaged, and traveling is carried out by the drive force of only the motor MG.

The engine Eng is capable of lean combustion, and the engine torque is controlled to match the command value by controlling the amount of intake air by a throttle actuator, the amount of fuel injection by an injector, and the ignition timing by a spark plug.

The engine Eng can be started by cranking with the motor MG, while the first clutch CL1 is slip-engaged. In addition, the configuration can be such that starting is possible with a starter motor, which is not shown, under low-temperature conditions or high-temperature conditions, etc.

The first clutch CL1 is a frictional engagement element that is interposed between the engine Eng and the motor MG. A clutch that is able to switch between full engagement, half engagement, and disengagement with a stroke control based on a first clutch hydraulic pressure that is supplied from a hydraulic pressure control circuit 110, described below, is used as said first clutch CL1.

The motor MG has an AC synchronous motor structure that serves as a travel drive source and is used for carrying out drive torque control and rotational speed control during starting and traveling, as well as for recovering the vehicle kinetic energy generated by the regenerative braking control to the high-capacity battery BAT during braking and deceleration. An inverter INV, which converts direct current to three-phase alternating current during powering and converts three-phase alternating current to direct current during regeneration, is interposed between the motor MG and the high-capacity battery BAT.

The second clutch CL2 is a frictional engagement element that is interposed between the motor MG and left and right front wheels FL and FR, which are the drive wheels. This second clutch CL2 is also controlled to be in full engagement or slip engagement or disengagement with a stroke control according to a second clutch hydraulic pressure that is supplied from the hydraulic pressure control circuit 110.

The continuously variable transmission CVT is well-known and comprises, although not shown, a primary pulley, a secondary pulley, and a belt that is wound around both pulleys. Furthermore, this continuously variable transmission CVT is a transmission that realizes a stepless transmission ratio by changing the winding diameter of the belt, by a primary pressure and a secondary pressure that are supplied from the hydraulic pressure control circuit 110 to a primary oil chamber and a secondary oil chamber.

The hydraulic pressure control circuit 110 comprises, as hydraulic power sources, a main oil pump MOP (mechanical drive) and a sub-oil pump SOP (motor drive). The main oil pump MOP is rotationally driven by a motor shaft of the motor MG (=transmission input shaft). In addition, the sub-oil pump SOP is driven by a built-in motor and is mainly used as an auxiliary pump for providing lubricating and cooling oil. The sub-oil pump SOP is driven by power supplied from a DC/DC converter 80, described below.

The hydraulic pressure control circuit 110 comprises a first clutch solenoid valve 111, a second clutch solenoid valve 112, and a transmission control valve mechanism 113. The first clutch solenoid valve 111 and the second clutch solenoid valve 112 use a line pressure PL that is generated by adjusting the pump discharge pressure from the hydraulic power source as the source pressure, and respectively form a first clutch pressure and a second clutch pressure based on the stroke amount thereof.

The transmission control valve mechanism 113 comprises a manual valve 113*a* that can be switched by a shift lever, which is not shown, and a transmission solenoid valve 113*b* that is operated by the transmission controller 11.

The position of the manual valve 113*a* is switched according to the shifting of the shift lever to the traveling range (including the so-called drive range and the reverse range (D/R)), the neutral range (N), and the parking range (P). Then, the manual valve 113*a* supplies a line pressure PL to the continuously variable transmission CVT in the traveling range (D/R), and drains the line pressure PL in the neutral range (N) and the parking range (P).

The transmission solenoid valve 113b uses the line pressure PL that is supplied from the manual valve 113a as the source pressure to create a primary pressure and a secondary pressure according to the stroke amount thereof. In addition, the second clutch solenoid valve 112 described above is disposed on the downstream side of the manual valve 113a. That is, the second clutch CL2 is also able to serve as an engagement element of the continuously variable transmission CVT. Therefore, hydraulic pressure is supplied to the second clutch CL2 in the traveling range (D/R) for supplying hydraulic pressure from the manual valve 113a to the continuously variable transmission CVT, and hydraulic pressure is not supplied in the neutral range (N) and the parking range (P).

In addition, in the first embodiment, the two clutch solenoid valves 111 and 112 to be used carry out an engagement operation of the two clutches CL1 and CL2 when not energized and carry out a releasing operation of the two clutches CL1 and CL2 when energized.

That is, when not energized, the spools, not shown, of the two clutch solenoid valves 111 and 112 are positioned so that the valve opening amount is such that the line pressure PL is supplied to the engagement operation side of the two clutches CL1 and CL2 by a biasing force of an elastic member, such as a return spring. At the time of energization, on the other hand, the two clutch solenoid valves 111 and 112 move the spool in a direction to increase on the side to drain the hydraulic pressure that is acting on the engagement side of the two clutches CL1 and CL2, in order to release the two clutches CL1 and CL2, by the electromagnetic force of the solenoids.

Therefore, when the clutch solenoid valves 111 and 112 are no longer energized due to a failure, such as disconnected wires, the clutches CL1 and CL2 are bought into an ON-failure state that is fixed to the engaged state. Conversely, when the clutch solenoid valves 111 and 112 are kept energized due to a failure such as short-circuiting of the wiring, the clutches CL1 and CL2 are held in an OFF-failure state that is fixed to the released state.

As described above, a hybrid vehicle comprises an "EV mode," an "HEV mode," and an "(HEV) WSC mode" as the main drive modes, and a hybrid drive system called one-motor and two-clutch system is configured therein.

The "EV mode" is an electric vehicle mode that has only the motor MG as the drive source by releasing the first clutch CL1 and engaging the second clutch CL2. The "HEV mode" is a hybrid vehicle mode that has the engine Eng and the motor MG as drive sources by engaging both clutches CL1 and CL2. The "WSC mode" is a CL2 slip engagement mode in which the rotational speed of the motor MG is controlled in the "HEV mode," and the second clutch CL2 is slip-engaged with an engagement torque capacity corresponding to a required driving force. This "WSC mode" is selected to absorb the rotational difference between the left and right front wheels FL and FR and the engine Eng that is rotated at greater than or equal to the engine idle rotational speed, in the stopped to the starting regions, or the low-speed to the stopped regions, while in the "HEV mode," by a CL2 slip engagement. The reason that the "WSC mode" is necessary is because the drive system does not have a rotational difference absorption joint, such as a torque converter.

Control System of the Hybrid Vehicle

The control system of the hybrid vehicle will be described next. The control system of the hybrid vehicle comprises an inverter INV, a high-capacity battery BAT, an integrated controller 10, a transmission controller 11, a clutch controller 12, an engine controller 13, a motor controller 14, a battery controller 15, and an AC controller 16.

The power supply system of the hybrid vehicle comprises a high-capacity battery BAT as a motor-generator power supply, and a 12V battery (not shown) as a 12V load power supply.

The inverter INV carries out DC/AC conversion, and generates a drive current for the motor MG. The inverter also reverses the output rotation of the motor MG by reversing the phase of the generated drive current. The high-capacity battery BAT is a secondary battery that is mounted as a power source of the motor MG, and can be, for example, a lithium-ion battery, which is a cell module configured from numerous cells placed inside a battery housing. In the present embodiment, the high-capacity battery is not limited to a lithium-ion battery, and may be a power storage means such as a nickel-hydrogen battery.

The inverter INV converts the DC power from the high-capacity battery BAT to three-phase alternating current and supplies same to the motor MG at the time of powering, wherein the motor MG is driven by the discharge of the high-capacity battery BAT, by a powering-regeneration control by the motor controller 14. In addition, the inverter converts the three-phase AC power from the motor MG to DC power at the time of regeneration for charging the high-capacity battery BAT by the power generated by the motor MG.

The integrated controller 10 is configured from an electronic control unit (ECU) that is provided with a microcomputer, and calculates a target drive torque, and the like, from the remaining state of charge of the battery (the battery SOC), the accelerator position opening amount APO, the vehicle speed VSP, and the like. Then, based on the calculation result, the integrated controller 10 calculates command values for each of the actuators (the motor MG, the engine Eng, the first clutch CL1, the second clutch CL2, the continuously variable transmission CVT), which are transmitted to the respective controllers 11-15.

The battery SOC is input from the battery controller 15. The accelerator position opening amount APO is detected by an accelerator position opening amount sensor 21. The vehicle speed VSP is a value that is synchronized with the transmission output rotational speed, and is detected by a transmission output rotational speed sensor 22. In addition, this integrated controller 10 controls the discharge flow rate of the main oil pump MOP, the discharge flow rate of the sub-oil pump SOP, and the line pressure PL.

The transmission controller 11 performs a shift control so as to carry out a gear shift command from the integrated controller 10. This shift control is carried out by controlling the hydraulic pressure that is supplied to the primary pulley and the hydraulic pressure that is supplied to the secondary pulley of the continuously variable transmission CVT based on the control of the transmission control valve mechanism 113 using the line pressure PL that is supplied via the hydraulic pressure control circuit 110 as the source pressure. Then, the surplus pressure, which is generated when creating the hydraulic pressure that is supplied to the primary pulley and the hydraulic pressure that is supplied to the secondary pulley from the line pressure PL, is used to help cool and lubricate the first clutch CL1 and the second clutch CL2.

The clutch controller 12 inputs a second clutch input rotational speed, a second clutch output rotational speed, a clutch oil temperature, and the like, and carries out a first clutch control and a second clutch control, so as to realize the first clutch control command and the second clutch control command from the integrated controller 10.

This first clutch control is carried out by controlling the hydraulic pressure that is supplied to the first clutch CL1 based on the control of the first clutch solenoid valve 111, using the line pressure PL that is supplied via the hydraulic pressure control circuit 110 as the source pressure.

In addition, the second clutch control is carried out by controlling the hydraulic pressure that is supplied to the second clutch CL2 based on the control of the second clutch solenoid valve 112, using the line pressure PL that is supplied via the hydraulic pressure control circuit 110 as the source pressure.

Then, the surplus pressure, which is generated when creating the hydraulic pressure that is supplied to the first clutch CL1 and the hydraulic pressure that is supplied to the second clutch CL2 from the line pressure PL, is passed onto cooling and lubricating the first clutch CL1 and the second clutch CL2.

The engine controller 13 inputs the engine rotational speed that is detected by the engine rotation speed sensor 23, target engine torque commands from the integrated controller 10, etc. Then, the engine controller 13 carries out start control, fuel injection control, ignition control, fuel cut-off control, and the like, in order to control the engine torque so as to realize the target engine torque command value.

The motor controller 14 inputs target motor torque command values and motor rotational speed command values from the integrated controller 10, the motor rotational speed that is detected by the motor rotational speed sensor 24, and the like Then, the motor controller 14 carries out controls such as powering control and regenerative control, motor creep control, and motor idle control of the motor MG, so as to realize the target motor torque command value and the motor rotational speed command value.

The battery controller 15 manages the battery temperature, the battery SOC, which is the remaining charge of the high-capacity battery BAT, and the like, based on the input information from a battery voltage sensor 25, a battery temperature sensor 26, and the like, and transmits the information to the integrated controller 10.

The AC controller 16 controls the operation of an electric air conditioner 70 based on the detection of a sensor (not shown) that detects various environmental factors that relate to the vehicle interior temperature. This electric air conditioner 70 is operated by a power supply from the high-capacity battery BAT to adjust the temperature inside the vehicle, and an electric compressor 71 that compresses a refrigerant is provided to this electric air conditioner 70. This electric compressor 71 incorporates an inverter (not shown), converts DC power that is supplied from the high-capacity battery BAT to AC power, and is driven by a motor (not shown). A DC/DC converter 80 is connected to the high-capacity battery BAT in parallel with the electric air conditioner 70. This DC/DC converter 80 supplies DC power to on-board electric devices, such as the sub-oil pump SOP, after transforming the voltage of the high-capacity battery BAT.

Control by the Integrated Controller

Figure 2:
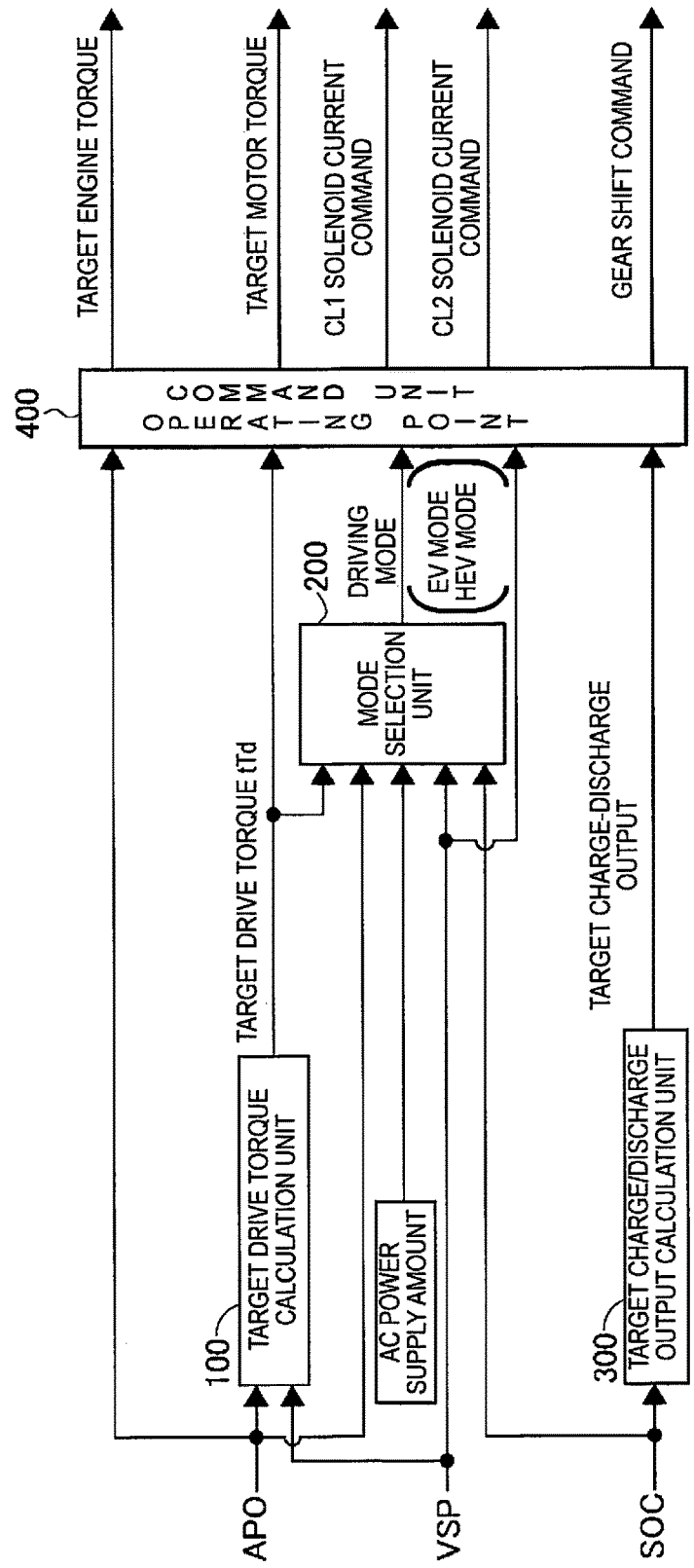
FIG. 2 is a block diagram illustrating a configuration of an integrated controller of the fail-safe control device for hybrid vehicles according to the first embodiment.

Control by the integrated controller 10 will now be briefly described. The integrated controller 10 comprises a target drive torque calculation unit 100, a mode selection unit 200, a target charge-discharge output calculation unit 300, and an operating point command unit 400, as illustrated in FIG. 2.

In the target drive torque calculation unit 100, the accelerator position opening amount APO, the vehicle speed VSP, etc., are input, and a target drive torque tTd (target vehicle total torque) is calculated from a target stationary torque map (one example of an engine torque map), and an assist torque map (one example of a motor-generator torque map).

The mode selection unit 200 calculates which drive mode will be the target drive mode, that is, the HEV mode or the EV mode. The setting of the drive mode by the mode selection unit 200 can be, for example, selected between the EV mode and the HEV mode according to the vehicle speed VSP and the accelerator position opening amount APO based on a mode selection map that is set in advance; however, the details are omitted.

The target charge-discharge output calculation unit 300 increases the power generation amount when the battery SOC is low, reduces the power generation amount when the battery SOC is high, and calculates the target charge-discharge power tP so as to increase the motor assistance.

The operating point command unit 400 calculates the operating point arrival targets from the accelerator position opening amount APO, the target drive torque tTd, the drive mode, the Vehicle speed VSP, and the target charge-discharge power tP, which are output as command values. A target engine torque, a target motor torque, a target CL2 torque capacity, a target transmission ratio, a first clutch solenoid current command, and a second clutch solenoid current command are calculated as these operating point arrival targets. In the present embodiment, the operating point command unit integrally calculates the target engine torque, the target motor torque, the target CL2 torque capacity, the target transmission ratio, the first clutch solenoid current command, and the second clutch solenoid current command; however, a means to calculate the command values can be provided for each.

Clutch Failure Determination Unit

The clutch failure determination unit 30 illustrated in FIG. 1 will be described next. The clutch failure determination unit 30 determines the presence or absence of an ON-failure of each of the clutches CL1 and CL2, based on the command current values to the first clutch CL1 and the second clutch CL2.

This ON-failure refers to a state in which both clutches CL1 and CL2 are respectively fixed in a connected state, which occurs when the command current value of the solenoid valves 111 and 112 is below a predetermined value, such as when not energized. That is, if the command current value falls below the normal control value, sufficient excitation force of the solenoid to move the spool (not shown) cannot be obtained. Consequently, the spool (not shown) cannot be sufficiently moved against the biasing force of the elastic member, and the opening amount of the valve that connects the clutch engagement operation side with the line pressure side becomes greater than or equal to a predetermined amount, causing the supplied pressure to exceed a predetermined value, resulting in a failure.

Therefore, the clutch failure determination unit 30 inputs the command current value to each solenoid valve 111 and 112, and determines the presence of an ON-failure when a state in which the command current value is an abnormality determination current value, which is set in advance and is below the normal command value, continues for at least an abnormality determination time, which is set in advance.

Figure 3:
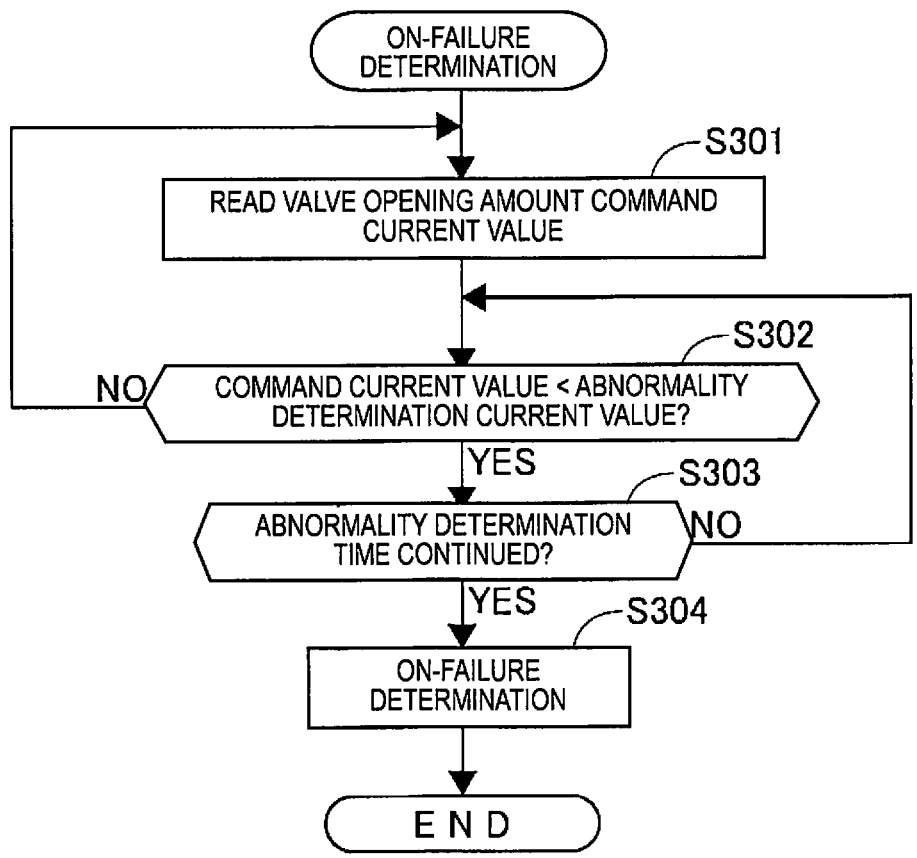
FIG. 3 is a flowchart illustrating the steps of an ON-failure determination process of the clutch failure determination unit in the fail-safe control device for hybrid vehicles according to the first embodiment.

FIG. 3 is a flowchart illustrating the steps of an ON-failure determination process of the clutch failure determination unit 30. This ON-failure determination is started when an ignition switch, which is not shown, is turned ON, and is independently executed for each of the clutches CL1 and CL2. First, in Step S301, a command current value that controls the valve opening amount of each of the solenoid valves 111 and 112 (engagement state of each clutch CL1 and CL2) is read, and the steps proceed to Step S302.

In Step S302, it is determined whether or not the command current value is less than an abnormality determination current value; if the command current value is less than the abnormality determination current value, the steps proceed to Step S303; and if greater than the abnormality determination current value, the process returns to Step S301. The abnormality determination current value is set to a current value whereby the opening amount of the valve that links the line pressure side and the clutch engagement operation side of the solenoid valves 111 and 112 becomes an opening amount that exceeds an abnormal opening amount, which is set in advance and is greater than the opening amount range that is used in a normal control.

In Step S303, to which the steps proceed when the command current value is less than an abnormality determination current value, it is determined whether or not the duration during which the command current value has been an abnormality determination current value has exceeded an abnormality determination time, which is set in advance. If the duration has exceeded the abnormality determination time, the steps proceed to Step S304, and if the duration has not exceeded the abnormality determination time, the steps return to Step S302. The abnormality determination time is set to a time with which it is possible to exclude cases in which an abnormal opening amount is exceeded due to an overshoot during normal operation. Then, an ON-failure is determined in Step S304, to which the steps have proceeded when the duration during which the command current value has been less than the abnormality determination current value has exceeded the abnormality determination time, which is set in advance. In addition, in the first embodiment, a warning indicator is illuminated at the time of said failure determination.

Fail-Safe Control

Figure 4:
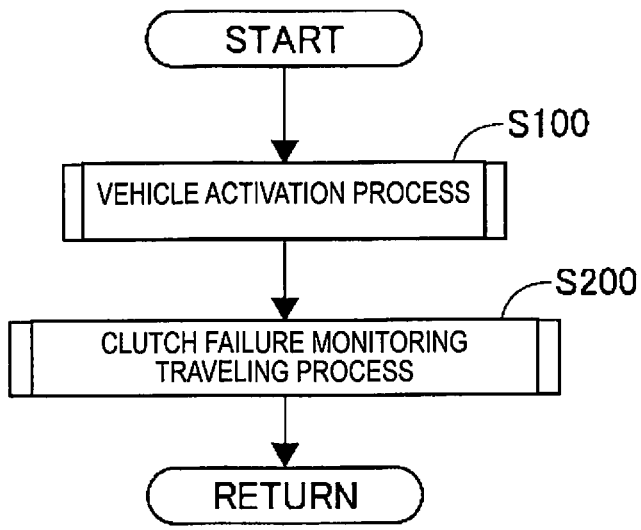
FIG. 4 is a flowchart illustrating the steps of the main process of a fail-safe control that is executed by the integrated controller in the fail-safe control device for hybrid vehicles according to the first embodiment.
Figure 5:
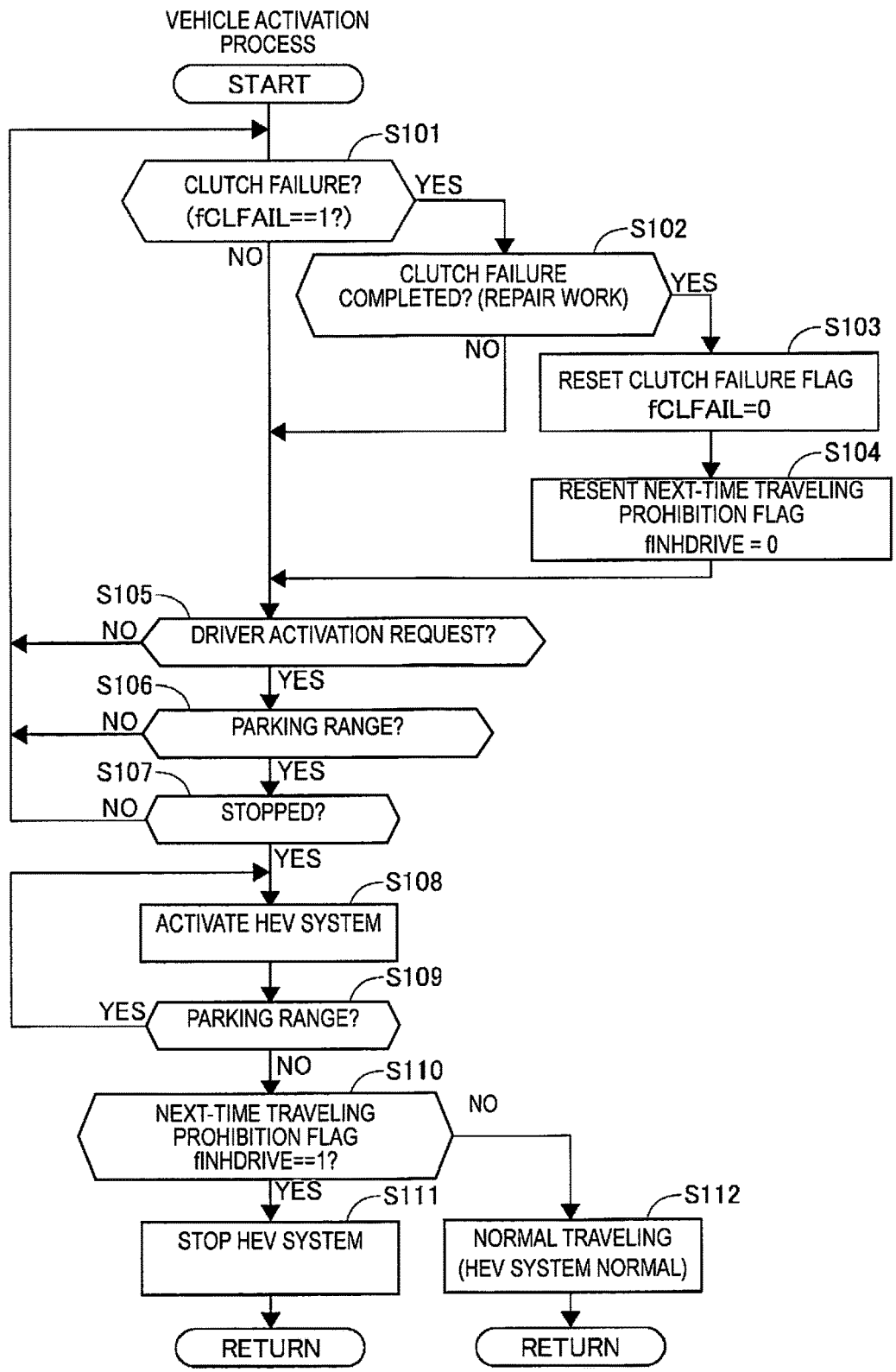
FIG. 5 is a flowchart illustrating the steps of a vehicle activation process that is executed by the integrated controller in the fail-safe control device for hybrid vehicles according to the first embodiment.
Figure 6:
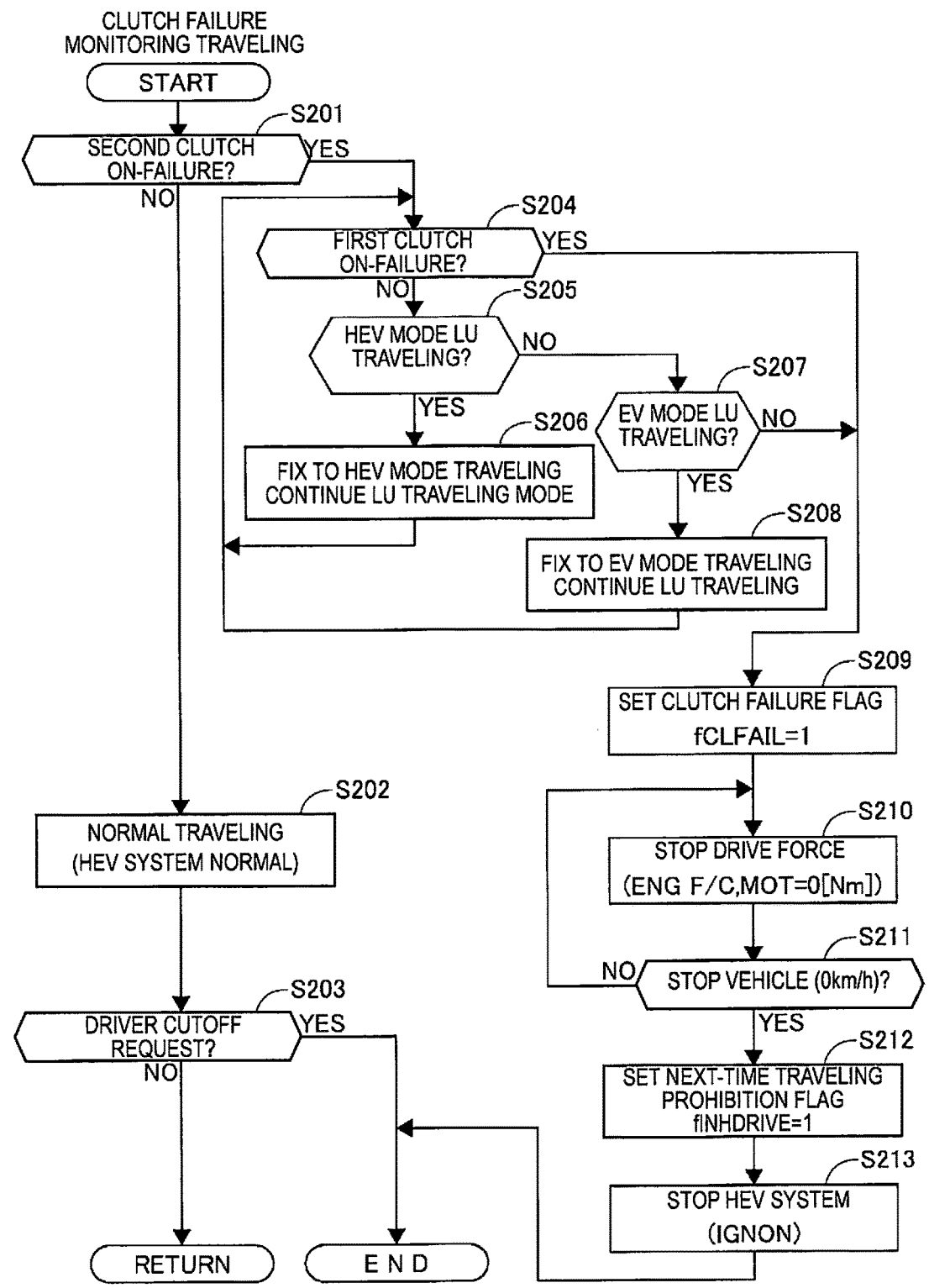
FIG. 6 is a flowchart illustrating the steps of a clutch failure monitoring during travel process that is executed by the integrated controller in the fail-safe control device for hybrid vehicles according to the first embodiment.

The fail-safe control corresponding to an ON-failure of the two clutches CL1 and CL2, which is executed by the integrated controller 10, will now be described based on the flowcharts of FIG. 4-FIG. 6. FIG. 4 illustrates the main process of the fail-safe control that is executed by the integrated controller 10.

First, in Step S100, if vehicle activation process is executed and normal travel, described below, is started, the steps proceed to Step S200, and a clutch failure monitoring during travel process is executed.

The vehicle activation process is started by switching the ignition switch (not shown) from OFF to ON, and normal traveling is permitted when the clutch is not failing; and when the clutch is failing, a fail-safe process is executed, in which traveling is prohibited but starting of the engine Eng is permitted. In the clutch failure monitoring during travel process, the presence or absence of a failure of the two clutches CL1 and CL2 is determined during traveling, and a fail-safe process, which corresponds to the presence or absence of a failure, the failure state, and the traveling state, is executed.

The vehicle activation process and the clutch failure monitoring during travel process are described below, based on the flowcharts of FIG. 5 and FIG. 6.

Vehicle Activation Process

First, the vehicle activation process is described with reference to FIG. 5. The vehicle activation process is executed after the driver switches the ignition switch, which is not shown, from OFF to ON, and then carries out an ON operation of a starter switch, which is not shown.

In Step S101, it is determined whether or not there is a clutch failure according to whether or not a clutch failure flag fCLFAIL is set (=1); at the time of a clutch failure, the steps proceed to Step S102; and when there is no clutch failure, the steps proceed to Step S105. The setting of this clutch failure flag fCLFAIL, which indicates a clutch failure, is carried out by detecting an ON-failure of the clutches CL1 and CL2 during the clutch failure monitoring during travel process, described below, during previous travel, which will be described in detail below.

In Step S102, to which the steps proceed at the time of a clutch failure, it is determined whether or not a clutch failure repair has been completed; if the clutch failure repair has been completed, the steps proceed to Step S103, and if the clutch failure repair has not been completed, the steps proceed to Step S105. Said clutch failure repair is carried out by human labor at a factory, or the like, and when the repair is completed, a worker inputs predetermined information that indicates the completion of the failure repair to the integrated controller 10. Then, in Step S103, to which the steps proceed when the failure repair is completed, the clutch failure flag fCLFAIL is reset (=0), and the steps proceed to Step S104.

Furthermore, in Step S104, a next-time traveling prohibition flag fINHDRIVE is reset (=0). The setting of the next-time traveling prohibition flag fINHDRIVE is carried out when detecting a clutch failure during the clutch failure monitoring during travel process described below, during the previous travel, which will be described in detail below.

Steps S105-S108 determine whether the HEV system is to be activated and the activation of the HEV system. In the activation of the HEV system, the high-capacity battery BAT is made capable of supplying power, the motor MG is driven to create the necessary line pressure PL, and the engine Eng is driven according to system requests. Examples of system requests include a request to generate power in response to a decrease in the battery SOC, and a temperature increase request of the engine cooling water and oil. First, in Step S105, it is determined whether or not a driver has issued an activation request; if there is an activation request, the steps proceed to Step S106; and if an activation request has not been issued, the steps return to Step S101. An activation request may be either one of an ON operation of an ignition switch, which is not shown, and an ON operation of a start switch, which is not shown, or may be another operation.

In Step S106, to which the steps proceed when there is an activation request from the driver, it is determined whether or not the shift position is in the parking range (P); if the shift position is in the parking range (P), the steps proceed to Step S107; and if the shift position is not in the parking range (P), the steps return to Step S101.

In Step S107, to which the steps proceed when the shift position is in the parking range (P), it is determined whether or not the vehicle is in a stopped state; if the vehicle is in a stopped state, the steps proceed to Step S108; and if the vehicle is not in a stopped state, the steps return to Step S101. Then, in Step S108, the HEV system is activated.

In Step S109, to which the steps proceed after the HEV system is activated in Step S108, it is determined whether or not the shift position is maintained in the parking range (P). Then, while the shift lever is maintained in the parking range (P), the steps return to Step S108 to maintain the HEV system activated state; and when the shift lever is switched to a position other than the parking range (P) and the driver has the intention to start, the steps proceed to Step S110.

If the shift lever is in the parking range (P), since the hydraulic pressure supply path from the hydraulic pressure control circuit 110 to the continuously variable transmission CVT and the second clutch CL2 is linked to the drain side, the second clutch CL2 is released regardless of the command current value and will not be connected. In addition, since the hydraulic pressure supply path is different, the first clutch CL1 can be engaged at the time of said HEV system activation.

In Step S110, to which the steps proceed when the shift lever is switched to a range other than the parking range (P) and the driver has the intention to start, it is determined whether or not a next-time traveling prohibition flag fINHDRIVE is set (=1). Then, if a next-time traveling prohibition flag fINHDRIVE is set, the steps proceed to Step S111, and the HEV system is stopped to bring the vehicle to a non-travelable state, and if the next-time traveling prohibition flag fINHDRIVE is not set (=0), the steps proceed to Step S112 and normal traveling is carried out.

As described above, in the vehicle activation process, if the next-time traveling prohibition flag fINHDRIVE is set when the driver performs an activation operation, the activation of the HEV system is permitted only in the parking range (P). In addition, if the next-time traveling prohibition flag fINHDRIVE is not set, normal traveling is permitted. A next-time traveling prohibition flag fINHDRIVE is set when stopping after detecting an ON-failure of one or both of the two clutches CL1 and CL2 during the previous travel.

Clutch Failure Monitoring During Travel Process

The clutch failure monitoring during travel process will now be described based on the flowchart of FIG. 6. In this clutch failure monitoring during travel process, the presence or absence of an ON-failure of the two clutches CL1 and CL2 is monitored, and when an ON-failure occurs, a predetermined fail-safe process is executed according to the vehicle state.

This clutch failure monitoring during travel process is executed from the point in time that normal traveling is initiated by the vehicle activation process described above. First, in Step S201, it is determined whether or not there is an ON-failure of the second clutch CL2; when there is a failure, the steps proceed to Step S204, and if an ON-failure has not occurred, the steps proceed to Step S202. In Step S202, to which the steps proceed when an ON-failure has not occurred in the second clutch CL2, normal traveling is carried out. During this normal travel, the HEV system carries out an operation according to a normal command. Furthermore, in Step S203, to which the steps proceed in the case of normal traveling, it is determined whether there is a cutoff request from the driver; if there is a cutoff request from the driver, the clutch failure monitoring during travel process is ended; and if a cutoff request is absent, the steps return to Step S201, and the clutch failure monitoring during travel process is continued. A cutoff request is determined to be present by a switching operation of the ignition switch (not shown) from ON to OFF.

In Step S204, to which the steps proceed when an ON-failure has occurred in the second clutch CL2 in Step S201, it is determined whether or not there is an ON-failure of the first clutch CL1. If there is an ON-failure of the first clutch CL1, the steps proceed to Step S209, and if an ON-failure is absent, the steps proceed to Step S205.

Here, Steps S201 and S204 also serve to determine power source failures. That is, as described above, an ON-failure determination is carried out according to whether or not the command current value to each clutch solenoid valve 111 and 112 has decreased below the abnormality determination current value. Therefore, if the command current values of both clutch solenoid valves 111 and 112 have decreased below the abnormality determination current value, and there is a YES determination in both Steps S201 and S204, it is considered to be a power source failure, and the steps proceed to Step S209.

If there is no failure of the first clutch CL1 in Step S204, the fail-safe traveling is switched according to the traveling state of the vehicle. That is, in Step S205, it is determined whether or not the current traveling mode is the HEV mode and the vehicle is carrying out LU traveling, in which the second clutch CL2 is brought into a lock-up state. Then, if the vehicle is in the HEV mode and carrying out LU traveling, the steps proceed to Step S206; otherwise, the steps proceed to Step S207.

In Step S206, to which the steps proceed when the vehicle is in the HEV mode and LU traveling is being carried out in Step S205, traveling is fixed to the HEV mode, and LU traveling is continued with the second clutch CL2 in a lock-up state, and the steps return to Step S204. Traveling in the HEV mode can thereby be continued.

In Step S207, to which the steps proceed when the vehicle is not in the HEV mode and/or LU traveling is not being carried out in Step S205, it is determined whether or not the current traveling mode is the EV mode and the vehicle is carrying out LU traveling, in which the second clutch CL2 is brought into a lock-up state. Then, if the vehicle is in the EV mode and carrying out LU traveling, the steps proceed to Step S208; otherwise, the steps proceed to Step S209.

In Step S208, to which the steps proceed when the vehicle is in the EV mode and LU traveling is being carrying out in Step S207, traveling is fixed to the EV mode, and LU traveling is continued with the second clutch CL2 in a lock-up state, and the steps return to Step S204. Accordingly, traveling is possible while the power supplied from the high-capacity battery BAT is continued, in the EV mode.

In Step S209, to which the steps proceed when there is an ON-failure of the two clutches CL1 and CL2, or, when the second clutch CL2 is caused to slip without being brought into a lock-up state, a clutch failure flag fCLFAIL is set and the steps proceed to Step S210. A NO determination is made in Steps S205 and S207 when the second clutch CL2 is caused to slip; this occurs, for example, when the vehicle speed VSP is reduced and the vehicle shifts to the WSC mode, while traveling in the HEV mode.

Thereafter, the driving force is stopped (engine output and motor output are stopped) in Step S210, and the steps proceed to Step S211. In Step S211, it is determined whether a vehicle stop has occurred; the steps return to Step S210 until the vehicle is stopped, and when the vehicle is stopped, the steps proceed to Step S212.

In Step S212, a next-time traveling prohibition flag fIN-HDRIVE is set (=1), and in the subsequent Step S213, the HEV system is stopped, and the clutch failure monitoring traveling is ended.

The fail-safe process according to the vehicle state and the failure state when executing the fail-safe control described above is illustrated in the control list of FIG. 7. The control list will be described in order from the top.

(a) If the first clutch CL1 is not failing, the second clutch CL2 is in an ON-failure state, the shift position is in the traveling range (D/R), and the vehicle state is in the HEV mode while in the second clutch lock-up state, then the vehicle is fixed to the HEV mode. This is according to the process: Step S201→S204→S205→S206.

(b) If the first clutch CL1 is not failing, the second clutch CL2 is in an ON-failure state, the shift position is in the traveling range (D/R), and the vehicle state is in the EV mode while in the second clutch lock-up state, or the vehicle is transitioning from HEV mode lock-up to EV mode lock-up, then the vehicle is fixed to the EV mode. This is according to the process: Step S201→S204→S205→S207→S208.

(c) If the first clutch CL1 is not failing, the second clutch CL2 is in an ON-failure state, the shift position is in the traveling range (D/R), and the vehicle state is other than (a) (b) described above, then the driving force is stopped and the vehicle is stopped, after which the HEV system is stopped (READY-OFF). This is according to the process: Step S201→S204→(S205→S207→) S209→S210→S211→S212→S213. In addition, this is also according to the process: Step S101→S102→S105→S106→S101 at the time of vehicle activation.

(d) If the first clutch CL1 is not failing, the second clutch CL2 is in an ON-failure state, and the shift position is in the neutral range (N), then, regardless of the vehicle state, the driving force is stopped and the vehicle is stopped, after which the HEV system is stopped (READY-OFF). This is according to the same process as (c) above. In addition, in the neutral range (N), since only the drain pressure is supplied corresponding to the position (P) of the manual valve 113a, the second clutch CL2 is released despite the ON-failure.

(e) If the first clutch CL1 is not failing, the second clutch CL2 is in an ON-failure state, and the shift position is in the parking range (P), then the HEV system is activated (READY-ON). This is according to the process: Step S101→S102→S105→S106→S107→S108. In addition, in the parking range (P), since only the drain pressure is supplied corresponding to the position (P) of the manual valve 113a, the second clutch CL2 is released despite the ON-failure.

(f) If the first clutch CL1 and the second clutch CL2 are both in an ON-failure state, and the shift position is in the traveling range (D/R), then, regardless of the vehicle state, the driving force is stopped and the vehicle is stopped, after which the HEV system is stopped (READY-OFF). This is according to the process: Step S201→S204→S205→S207→S209-S213. In addition, this is also according to the process: Step S101→S102→S105→S106→S101 at the time of vehicle activation.

(g) If the first clutch CL1 and the second clutch CL2 are both in an ON-failure state, and the shift position is in the traveling range (D/R), then, regardless of the vehicle state, the driving force is stopped and the vehicle is stopped, after which the HEV system is stopped (READY-OFF). This is according to the process: Step S201→S204→S205→S207→S209-S213. In addition, this is also according to the process: Step S101→S102→S105→S106→S101 at the time of vehicle activation.

(h) If the first clutch CL1 and the second clutch CL2 are both in an ON-failure state, and the shift position is in the parking range (P), then activation is permitted and the HEV system is activated (READY-ON). This is according to the process: Step S101→S102→S105→S106→S107→S108. In addition, since only the drain pressure is supplied corresponding to the position (P) of the manual valve 113a, the second clutch CL2 is released despite the ON-failure.

Actions of the First Embodiment

Figure 8:
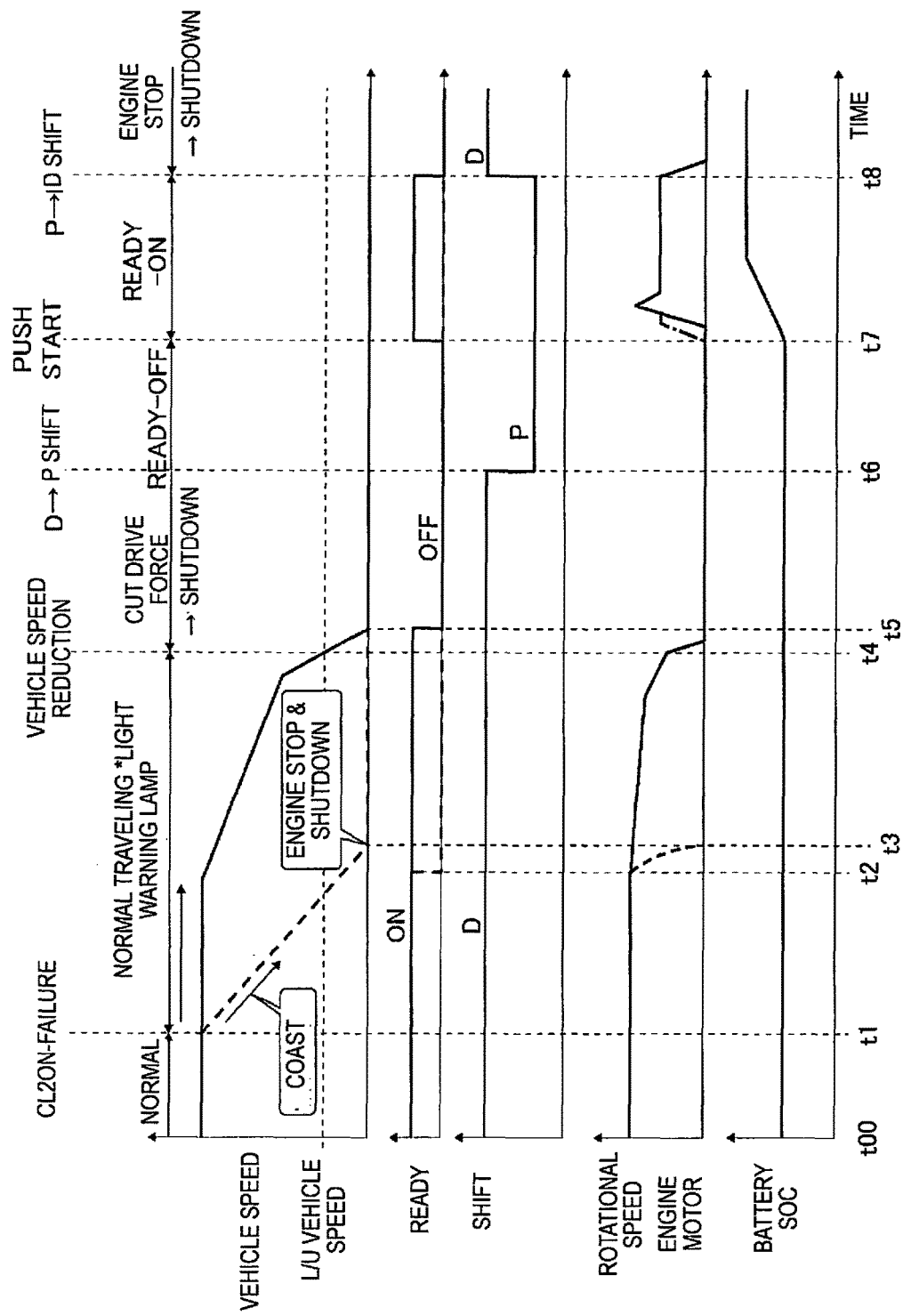
FIG. 8 is a timing chart illustrating one example of an operation in the event of an ON-failure of the second clutch in the fail-safe control device for hybrid vehicles according to the first embodiment, as well as in a comparative example thereof.

Next, the operation in the event of an ON-failure of the second clutch CL2 in the first embodiment will be described based on the timing chart of FIG. 8. The operation example of FIG. 8 is an operation example in which the vehicle is traveling in the HEV mode at time t00, and a failure occurs in the second clutch CL2 at time t1.

Here, the operation of a comparative example will be described first, before describing the operation of the first embodiment. This comparative example is an example in which the driving of the engine Eng and the motor MG is immediately stopped when detecting an ON-failure of the second clutch CL2, and the driving of the engine Eng and the motor MG is prohibited thereafter. In the case of this comparative example, the driving of the engine Eng and the motor MG is stopped at time t1, when the ON-failure of the second clutch CL2 is detected. Therefore, the vehicle reduces the vehicle speed VSP by coasting, as illustrated by the dotted line.

Thereafter, the vehicle is brought to a READY-OFF state at time t2, after the vehicle speed VSP is decreased lower than a lock-up vehicle speed (L/U vehicle speed), which is set in advance, and the vehicle is stopped at time t3. When stopped, the vehicle is brought into a shutdown state, in which the engine Eng and the motor MG are stopped.

In this case, even if activation is attempted at time t7 in the parking range (P), the vehicle remains in the READY-OFF state and cannot be activated.

As described above, in the comparative example, the vehicle can only be run by coasting from the point in time at which an ON-failure of the second clutch CL2 is detected. Therefore, evacuation behavior, etc., is restricted. In addition, even if traveling in the EV mode is permitted, the travelable distance is limited by the remaining battery capacity (battery SOC) of the high-capacity battery BAT. Additionally, the vehicle is in the READY-OFF state in this stopped state, and the electric power of the high-capacity battery BAT cannot be used when waiting for a tow, etc.; therefore, the electric air conditioner 70 cannot be caused to carry out a heating operation or a cooling operation. Therefore, there is the risk that a burden will be placed on the driver if the exterior temperature of the vehicle is high or low.

The operation in the first embodiment will be described next.

In the first embodiment, the vehicle is fixed in the HEV mode at time t2, when an ON-failure of the second clutch CL2 is detected during HEV mode traveling. The operation is based on Step S201→S204→S205→S206.

Therefore, it is possible to continue traveling in the HEV mode even after time t1, and a longer travelable distance than the comparative example can be secured.

Thereafter, the vehicle speed VSP is reduced together with the reduction in the required driving force of the driver as illustrated by the solid line in the figure, and when reduced to less than or equal to the lock-up vehicle speed (L/U vehicle speed) at time t4, the driving of the engine Eng and the motor MG is stopped. This is according to the process: Step S205→S207→S209→S210. The vehicle is thereby stopped at time t5, and brought into the READY-OFF state at this vehicle stop time (based on the process of Step S210→S211→S212→S213). At the time of this vehicle stop, the driver has put the shift position into the parking range (P) at time t6. Furthermore, the driver has carried out an activation operation (turning the ignition switch ON and pressing the start switch) at time t7.

At this time, in the first embodiment, since the vehicle is stopped and in the parking range (P), the HEV system is activated. Therefore, the vehicle is brought into a READY-ON state, and the motor MG is driven to increase the motor rotational speed as illustrated by the dashed-dotted line in the figure, and the first clutch CL1 is connected to start the engine Eng (based on the process of Step S105→S106→S107).

That is, this case corresponds to the (e) state in the control list view of FIG. 7, and the first clutch CL1 can be engaged according to the control command, and the engine Eng can be started by the driving of the motor MG. In addition, the hydraulic pressure supply path to the second clutch CL2 is connected to the drain side in accordance with the position of the manual valve 113a; therefore, the clutch is released even if fixed in the ON state, and the vehicle will not travel.

Therefore, from time t7, to time t8 when the driver carries out a shift change to the traveling range (D/R), the electric air conditioner 70 can be used, and charging to the high-capacity battery BAT is also possible. In the operation example of FIG. 8, charging is carried out from time t7, and the battery SOC is being increased.

Therefore, it is possible to use the electric air conditioner 70 and to reduce the burden on the driver and passengers, even when the driver is waiting for a tow truck, or the like, for a certain amount of time, in places where the outside environment is severe, or the like. In particular, it is possible to drive the engine Eng, suppressing exhaustion of the battery SOC of the high-capacity battery BAT, and it is possible to use electric power for a longer period of time. Thereafter, at time t8 when the driver shifts the shift position to the traveling range (D/R), the HEV system is stopped (according to the process of Step S109→S110→S111). Therefore, even if the HEV system is activated in an ON-failure state of the second clutch CL2, the vehicle will not travel.

Effects of the First Embodiment

The effects of the fail-safe control device for hybrid vehicles according to the first embodiment are listed below.

1) The fail-safe control device for hybrid vehicles according to the first embodiment, is a fail-safe control device for hybrid vehicles comprising: a power source including an engine Eng and a motor MG; a continuously variable transmission CVT provided between the motor MG and left and right front wheels FL and FR as the drive wheels; a first clutch CL1 provided between the engine Eng and the motor MG for connecting and disconnecting the engine Eng and the motor MG; a second clutch CL2 provided between the motor MG and the continuously variable transmission CVT for connecting and disconnecting the motor MG and the continuously variable transmission CVT; a clutch failure determination unit 30 as a clutch failure determination means that detects an ON-failure, which corresponds to an engagement state failure of the second clutch CL2; and an integrated controller 10 that switches between an HEV mode that uses the engine Eng and the motor MG as drive sources, and an EV mode that uses only the motor MG as the drive source by controlling the first clutch CL1 and the second clutch CL2; wherein the integrated controller 10 prohibits a transition from the HEV mode to the EV mode when the clutch failure determination unit 30 detects the ON-failure of the second clutch CL2 while traveling in the HEV mode. Therefore, it becomes possible to suppress the amount of electric power use and to extend the travel distance by the amount that is traveled while driving the engine Eng using fuel, compared to when allowing transition to the EV mode in the event of an ON-failure of the second clutch CL2.

2) The fail-safe control device for hybrid vehicles according to the first embodiment further comprises: a first clutch solenoid valve 111 as a first actuator that changes engagement and disengagement of the first clutch CL1; a second clutch solenoid valve 112 as a second actuator changes engagement and disengagement of the second clutch CL2; a power source that supplies power to both clutch solenoid valves 111 and 112; and a power source failure determination means (a part of the integrated controller 10) that detects a power source failure; wherein the integrated controller 10 forcibly stops the engine Eng and the motor MG when the power source failure determination means detects a power source failure. Therefore, when the power source fails, accurate information cannot be acquired, and the vehicle cannot be stably run. Therefore, it is possible to suppress the vehicle from continued to travel unstably due to the power source failure, by forcibly stopping the engine Eng and the motor MG when the power source fails.

3) In the fail-safe control device for hybrid vehicles according to the first embodiment, the clutch failure determination unit 30 is configured to individually detect an ON-failure of the first clutch CL1 and the ON-failure of the second clutch CL2, and the power source failure determination means detects a power source failure when the clutch failure determination means detects failures of the first clutch CL1 and the second clutch CL2 simultaneously (YES determination in Steps S201 and S204). That is, if there is an ON-failure of both clutches CL1 and CL2 at the same time, then it is more likely that an electric abnormality, rather than a mechanical failure, has occurred. Therefore, it is possible to detect a power source failure without adding, on the power source side, a configuration that electrically detects an abnormality.

4) The fail-safe control device for hybrid vehicles according to the first embodiment is provided with a second clutch solenoid valve 112 as a second actuator that operates the second clutch CL2 further toward a connection side as a valve opening amount is increased; it is determined that the ON-failure of the second clutch CL2 exists when the clutch failure determination unit 30 detects the valve opening amount of the second clutch solenoid valve 112 is at least a first predetermined opening amount for greater than or equal to an abnormality determination time as a predetermined time, and furthermore, the clutch failure determination means determines that the valve opening amount is at least a first predetermined opening amount when a command current to the second clutch solenoid valve 112, which increases the valve opening amount as a command current decreases, is less than or equal to an abnormality determination current value as a first predetermined current. Therefore, an erroneous detection of an ON-failure is suppressed when the second clutch solenoid valve 112 overshoots and the valve opening amount is temporarily increased, and the detection accuracy of ON-failures can be improved. In addition, since the command current value to the second clutch solenoid valve 112 is detected as the valve opening amount, it becomes possible to detect the valve opening amount in the event of an ON-failure without providing a means to detect the position, etc., of the spool, and it becomes possible to simplify the configuration and reduce the cost.

Other Embodiments

Next, the fail-safe control device for hybrid vehicles according to another embodiment will be described. Since the other embodiments are modification examples of the first embodiment, configurations common to the first embodiment are given the same reference symbols as the first embodiment, and the descriptions thereof are omitted, while only the differences from the first embodiment are described.

Second Embodiment

The fail-safe control device for hybrid vehicles according to the second embodiment is an example in which an OFF-failure is detected, where the second clutch CL2 is kept in a cutoff state and a fail-safe process corresponding thereto is executed.

Figure 9:
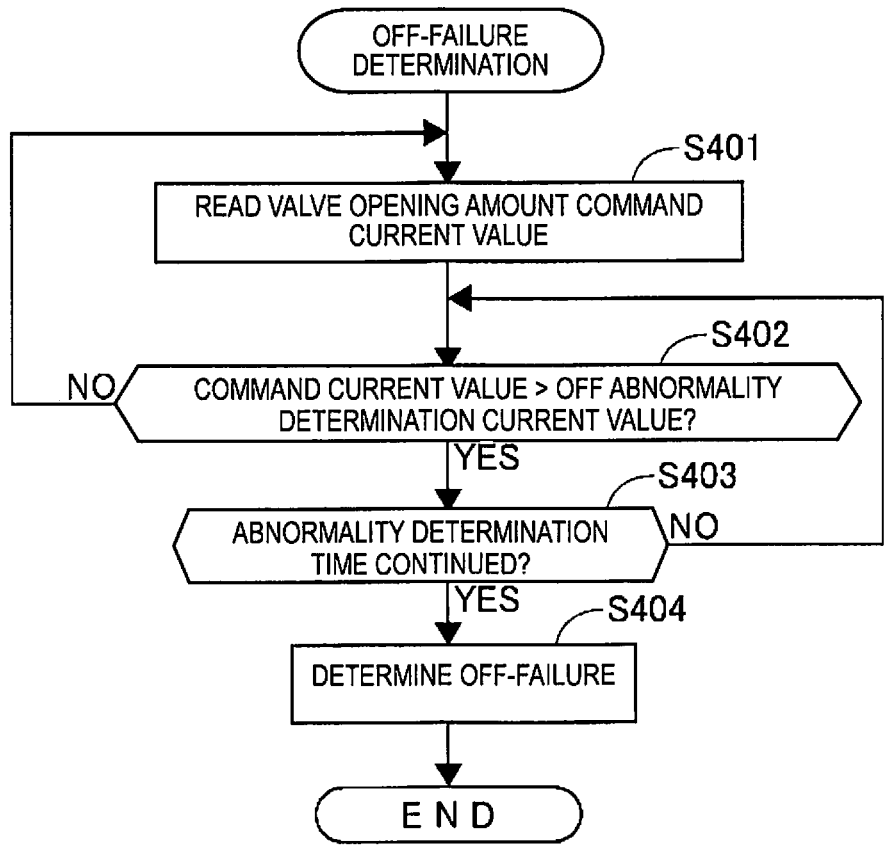
FIG. 9 is a flowchart illustrating the steps of an OFF-failure determination process of the clutch failure determination unit in the fail-safe control device for hybrid vehicles according to the second embodiment.

That is, in the second embodiment, the clutch failure determination unit 30 executes an OFF-failure determination process, as illustrated in FIG. 9, in parallel with the ON-failure determination process. In Step S401, a command current value that controls the valve opening amount of the second clutch solenoid valve 112 (engagement state of each clutch CL1 and CL2) is read, and the steps proceed to Step S402.

Then, in Step S402, it is determined whether or not the command current value has exceeded an OFF abnormality determination current value; if the command current value has exceeded the OFF abnormality determination current value, then the steps proceed to Step S403; and if the command current value is less than or equal to the OFF abnormality determination current value, then the steps return to Step S401. The OFF abnormality determination current value is set to a current value with which the opening amount of the valve that connects the drain side with the clutch engagement operation side of the second clutch solenoid valve 112 becomes an opening amount that exceeds an abnormal opening amount, which is set in advance and is greater than the opening amount range that is used during normal control.

In Step S403, to which the steps proceed when the command current value exceeds the OFF abnormality determination current value, it is determined whether or not the duration during which the command current value has exceeded the OFF abnormality determination current value has exceeded an abnormality determination time, which is set in advance. If the duration has exceeded the abnormality determination time, then the steps proceed to Step S404; and if the duration has not exceeded the abnormality determination time, then the steps return to Step S402. The abnormality determination time is set to a time with which it is possible to exclude cases in which an abnormal opening amount is exceeded due to an overshoot during normal operation.

Figure 10:
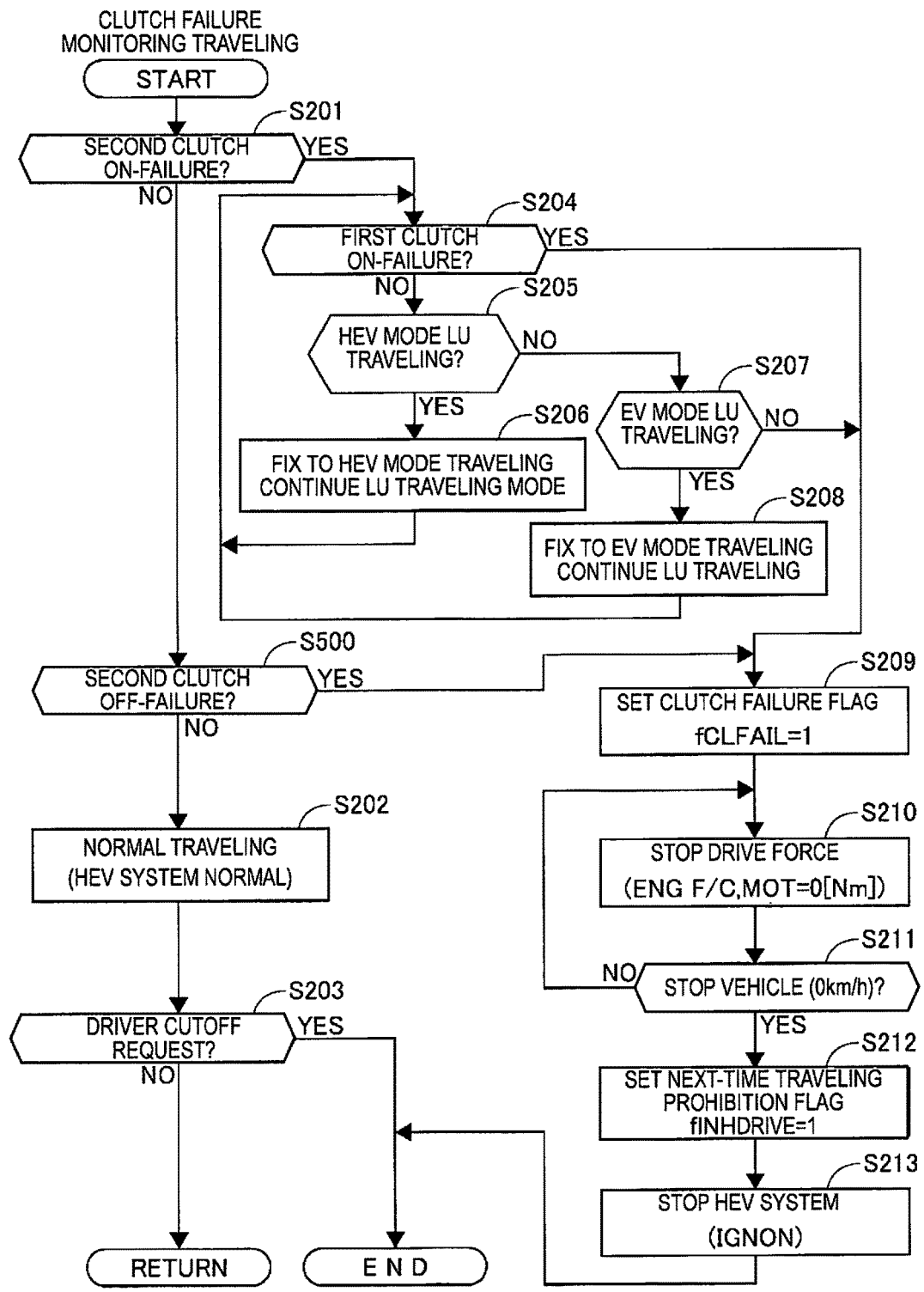
FIG. 10 is a flowchart illustrating the steps of a clutch failure monitoring during travel process that is executed by the integrated controller in the fail-safe control device for hybrid vehicles according to the second embodiment.

The clutch failure monitoring during travel process in the second embodiment will now be described based on the flowchart of FIG. 10. Since a portion of the first embodiment is changed in the second embodiment, only the changed portions will be described. In Step S500, to which the steps proceed when an ON-failure has not occurred in the second clutch CL2 in Step S201, it is determined whether or not there is an OFF-failure of the second clutch CL2. If there is an OFF-failure, then the steps proceed to Step S209; and if there is no OFF-failure, then the steps proceed to Step S202.

The action of the second embodiment will now be described. In the second embodiment, when an OFF-failure of the second clutch CL2 is detected, a clutch failure flag fCLFAIL is set, and the driving of the engine Eng and the motor MG is stopped. Then, when the vehicle stops thereafter, a next-time traveling prohibition flag fINHDRIVE is set, and the HEV system is stopped. The foregoing is based on the process of Step S201→S500→S209-S213.

In the second embodiment, if excess current flows due to a short-circuit, etc., in the command current system to the second clutch CL2, then the second clutch CL2 is fixed to a released state. In such a case, the driving of the engine Eng and the motor MG is stopped to stop the vehicle.

That is, if the second clutch CL2 is fixed to the released state, then the drive force of the engine Eng and the motor MG as the drive sources cannot be transmitted to the left and right front wheels FL and FR, which are the drive wheels. Therefore, the traveling of the vehicle cannot be continued and the drive force of the engine Eng and the motor MG will be wasted.

Therefore, in such a case, it is possible to suppress wasteful energy consumption by carrying out a fail-safe process that stops the engine Eng and the motor MG.

The effects of the second embodiment will be described below.

2-1) In the fail-safe control device for hybrid vehicles according to the second embodiment, the clutch failure determination unit 30 further detects an OFF-failure in which the second clutch CL2 is fixed to a cutoff state, and the integrated controller 10 stops the engine Eng and the motor MG when it is determined that an OFF-failure of the second clutch CL2 has occurred. Therefore, it is possible to suppress wasteful energy consumption in the event of an OFF-failure of the second clutch CL2.

2-2) The fail-safe control device for hybrid vehicles according to the second embodiment is further provided with a second clutch solenoid valve 112 that operates the second clutch CL2 further toward the connection side as the valve opening amount is increased, and it is determined that there is an OFF-failure of the second clutch CL2 when the clutch failure determination unit 30 detects a state in which the valve opening amount of the second clutch solenoid valve 112 on the side to drain the operating pressure of the second clutch CL2 has been greater than or equal to an abnormality determination opening amount for an abnormality determination time or more. Furthermore, the clutch failure determination means determines that the valve opening amount is at least the abnormality determination opening amount when a command current to the second clutch solenoid valve 112, which increases the valve opening amount on the drain side as the command current is increased, is greater than the OFF abnormality determination current value. Therefore, an erroneous detection of an OFF-failure is suppressed when the second clutch solenoid valve 112 overshoots and the valve opening amount is temporarily increased, and the detection accuracy of OFF-failures can be improved. In addition, since the command current value to the second clutch solenoid valve 112 is detected as the valve opening amount, it becomes possible to detect the valve opening amount in the event of an OFF-failure without providing a means to detect the position, etc., of the spool, and it becomes possible to simplify the configuration and reduce the cost.

The fail-safe control device for hybrid vehicles of the present invention was described above based on the embodiments, but specific configurations thereof are not limited to these embodiments, and various modifications and additions to the design can be made without departing from the scope of the invention according to each claim in the Claims.

For example, in the embodiments, a motor/generator that is capable of powering and regeneration was shown as the motor, but no limitation is imposed thereby, and a motor that is only capable of powering may be used as well. In addition, in the embodiments, examples were shown in which a continuously variable transmission is used as the transmission; however, the transmission is not limited to a continuously variable transmission, and other types of transmissions, manual or automatic, may be used as well.

Additionally, in the embodiments, the detection of the valve opening amount is realized by the detection of the command current value; however, the present invention is not limited thereto, and a stroke sensor for detecting the spool position of each solenoid valve may be provided, and the valve opening amount may be detected based on this detected position.

In addition, in the embodiments, an example was shown in which traveling is fixed to the EV mode when traveling in the EV mode at the time of an ON-failure of the second clutch; however, depending on the vehicle, the engine and the motor may be forcibly stopped. That is, a vehicle equipped with a brake-assist device that assists the brake pedal force by means of an engine negative pressure is known. Such a vehicle is provided with a means for reserving a certain degree of negative pressure during the EV mode, where the storage amount is limited. Therefore, in such a vehicle, the engine and the motor are forcibly stopped when it is detected that an ON-failure of the second clutch has occurred during traveling in the EV mode. As a result, it is possible to prevent the imparting of discomfort to the driver by losing the brake-assist function due to the non-generation of engine negative pressure, as in the case of continuing the EV mode traveling during an ON-failure of the second clutch.

Additionally, in the embodiment, controllers 110-118 are described as being provided, but the invention is not limited thereto; the controllers may be integrated into one controller.

The invention claimed is:

1. A fail-safe control device for hybrid vehicles, comprising:
   a power source including an engine and a motor;
   a transmission provided between the motor and drive wheels;
   a first clutch provided between the engine and the motor for connecting and disconnecting the engine and the motor;
   a second clutch provided between the motor MG and the transmission for connecting and disconnecting the motor and the transmission;
   a clutch failure determination unit that detects an ON-failure, which corresponds to an engaged state failure of the second clutch CL2; and
   a controller configured to switch between an HEV mode that uses the engine and the motor as drive sources, and an EV mode that uses only the motor as the drive source by controlling the first clutch and the second clutch;
   the controller being configured to prohibit a transition from the HEV mode to the EV mode upon the clutch failure determination unit detecting the ON-failure of the second clutch while traveling in the HEV mode.

2. The fail-safe control device according to claim 1, further comprising
   a first actuator that changes engagement and disengagement of the first clutch;
   a second actuator that changes engagement and disengagement of the second clutch; and
   a power source that supplies power to the first actuator and the second actuator;
   the controller being configured to detect a failure of the power source;
   the controller being configured to forcibly stop the engine and the motor upon detecting a failure of the power source.

3. The fail-safe control device according to claim 2, wherein
   the clutch failure determination unit is configured to individually detect an ON-failure of the first clutch and the ON-failure of the second clutch, and
   the controller is configured to detect a power source failure upon detecting the ON-failures of the first clutch and the second clutch simultaneously.

4. The fail-safe control device according to claim 2, wherein
   a second clutch solenoid valve is provided as the second actuator that operates the second clutch further to a connection side as a valve opening amount is increased, and
   the controller being configured to determine that the ON-failure of the second clutch exists upon detecting the valve opening amount of the second clutch solenoid valve is at least a first predetermined opening amount, which is greater than an opening amount range that is used in a normal control, or more, for greater than or equal to a predetermined time.

5. The fail-safe control device according to claim 4, wherein
   the second clutch solenoid valve is configured to increase the valve opening amount as a command current decreases, and
   the clutch failure determination unit determines that the valve opening amount is at least the first predetermined opening amount or more when the command current to the second clutch solenoid valve is less than or equal to a first predetermined current such that the valve opening amount of the second clutch solenoid valve becomes the first predetermined opening amount, which is greater than the opening amount range that is used in the normal control.

6. The fail-safe control device according to claim 3, wherein
   a second clutch solenoid valve is provided as the second actuator that operates the second clutch further to a connection side as a valve opening amount is increased, and
   the controller being configured to determine that the ON-failure of the second clutch exists upon detecting the valve opening amount of the second clutch solenoid valve is at least a first predetermined opening amount, which is greater than an opening amount range that is used in a normal control, or more, for greater than or equal to a predetermined time.

* * * * *